United States Patent
Nam et al.

(10) Patent No.: US 11,665,718 B2
(45) Date of Patent: May 30, 2023

(54) DYNAMIC CONTROL CHANNEL RESOURCES

(71) Applicant: QUALCOMM Incorporated, San Diego, CA (US)

(72) Inventors: Wooseok Nam, San Diego, CA (US); Srinivas Yerramalli, San Diego, CA (US); Jing Sun, San Diego, CA (US); Xiaoxia Zhang, San Diego, CA (US); Tao Luo, San Diego, CA (US); Zhifei Fan, San Diego, CA (US); Ahmed Abdelaziz Ibrahim Abdelaziz Zewail, San Diego, CA (US); Akula Reddy, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 162 days.

(21) Appl. No.: 17/010,638

(22) Filed: Sep. 2, 2020

(65) Prior Publication Data

US 2021/0105779 A1   Apr. 8, 2021

Related U.S. Application Data

(60) Provisional application No. 62/909,709, filed on Oct. 2, 2019.

(51) Int. Cl.
  *H04W 72/04* (2009.01)
  *H04W 72/12* (2009.01)
  *H04W 24/08* (2009.01)
  *H04W 72/1263* (2023.01)

(52) U.S. Cl.
  CPC ....... *H04W 72/0493* (2013.01); *H04W 24/08* (2013.01); *H04W 72/042* (2013.01); *H04W 72/1263* (2013.01)

(58) Field of Classification Search
  CPC .................................................. H04W 72/0493
  See application file for complete search history.

(56) References Cited

U.S. PATENT DOCUMENTS

| | | | |
|---|---|---|---|
| 11,310,779 B2* | 4/2022 | Bang | H04W 72/042 |
| 2017/0264417 A1 | 9/2017 | Eriksson et al. | |
| 2019/0104510 A1* | 4/2019 | Lee | H04W 72/04 |
| 2021/0410086 A1* | 12/2021 | Davydov | H04W 56/00 |
| 2022/0022149 A1* | 1/2022 | Lin | H04W 72/0446 |
| 2022/0116183 A1* | 4/2022 | Gao | H04L 1/1861 |

FOREIGN PATENT DOCUMENTS

CN  108632960 A  10/2018

OTHER PUBLICATIONS

3GPP TSG RAN WG1 Meeting #9, R1-1906592, Reno, USA, May 13-17, 2019,Agenda Item:7.2.9.3;Source:Huawei, HiSilicon ;Title: Reduction of PDCCH monitoring for UE power saving) (Year: 2019).*

(Continued)

*Primary Examiner* — Abdeltif Ajid
(74) *Attorney, Agent, or Firm* — Patterson+ Sheridan, L.L.P.

(57) ABSTRACT

Aspects of the present disclosure provide apparatus, methods, processing systems, and computer readable mediums for signaling and processing dynamic control channel resources.

29 Claims, 8 Drawing Sheets

(56) References Cited

OTHER PUBLICATIONS

HUAWEI., et al., "Reduction of PDCCH Monitoring for UE Power Saving," 3GPP Draft, 3GPP TSG RAN WG1 Meeting #97, R1-1906592, 3RD Generation Partnership Project (3GPP), Mobile Competence Centre, 650, Route Des Lucioles, F-06921, Sophia-Antipolis Cedex, France, vol. Ran WG1, No. Reno, USA; May 13, 2019-May 17, 2019, May 13, 2019 (May 13, 2019), XP051728043, 7 pages, Retrieved from the Internet: URL: http://www.3gpp.org/ftp/Meetings%5F3GPP%5FSYNC/RAN1/Docs/R1%2D1906592%2Ezip [retrieved on May 13, 2019] the whole document.

Intel Corporation: "Remaining Issues on Beam Management", 3GPP Draft, 3GPP TSG RAN WG1 Meeting #94, R1-1808669 Remaining Issues on BM, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), 16 Pages, XP051516045.

International Search Report and Written Opinion—PCT/US2020/049241—ISA/EPO—dated Nov. 12, 2020.

Qualcomm Incorporated: "Pdcch Monitoring Reduction and Power Saving for RedCap Devices," 3GPP Draft, 3GPP TSG RAN WG1 #102-e, R1-2006812, 3RD Generation Partnership Project (3GPP), Mobile Competence Centre 350, Route Des Lucioles, F-06921, Sophia-Antipolis Cedex, France, vol. RAN WG1, No. e-Meeting; 20200817-20200828, Aug. 8, 2020 (Aug. 8, 2020), XP051918262, 12 pages.

* cited by examiner (a) Micro-sleep with cross-slot scheduling
(b) Microsleep w/o cross-slot scheduling

DYNAMIC CONTROL CHANNEL RESOURCES

CROSS REFERENCE TO RELATED APPLICATION

This Application hereby claims priority under 35 U.S.C. § 119 to U.S. Provisional Patent Application No. 62/909,709, filed on Oct. 2, 2019, the contents of which are incorporated herein in their entirety.

TECHNICAL FIELD

Aspects of the present disclosure relate to wireless communications, and more particularly, to techniques for signaling and processing dynamic control channel resources.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

One innovative aspect of the subject matter described in this disclosure can be implemented in a method for wireless communications by a user equipment (UE). The method generally includes identifying a first set of control channel monitoring occasions according to a first control channel resource configuration, detecting a first physical downlink control channel (PDCCH) in one of the first control channel monitoring occasions, the first PDCCH indicating at least one set of dynamic control channel resources, and monitoring the at least one set of dynamic control channel resources for at least a second PDCCH.

Another innovative aspect of the subject matter described in this disclosure can be implemented in a method for wireless communications by a network entity. The method generally includes identifying a first set of control channel transmission occasions according to a first control channel resource configuration and transmitting a first physical downlink control channel (PDCCH) in one of the first control channel transmission occasions, the first PDCCH indicating at least one set of dynamic control channel resources.

Another innovative aspect of the subject matter described in this disclosure can be implemented in a user equipment (UE). The UE generally includes means for identifying a first set of control channel monitoring occasions according to a first control channel resource configuration, means for detecting a first physical downlink control channel (PDCCH) in one of the first control channel monitoring occasions, the first PDCCH indicating at least one set of dynamic control channel resources, and means for monitoring the at least one set of dynamic control channel resources for at least a second PDCCH.

Another innovative aspect of the subject matter described in this disclosure can be implemented in a network entity. The network entity generally includes means for identifying a first set of control channel transmission occasions according to a first control channel resource configuration and means for transmitting a first physical downlink control channel (PDCCH) in one of the first control channel transmission occasions, the first PDCCH indicating at least one set of dynamic control channel resources.

Another innovative aspect of the subject matter described in this disclosure can be implemented in a user equipment (UE). The UE generally includes a processing system configured to identify a first set of control channel monitoring occasions according to a first control channel resource configuration, detect a first physical downlink control channel (PDCCH) in one of the first control channel monitoring occasions, the first PDCCH indicating at least one set of dynamic control channel resources, and monitor the at least one set of dynamic control channel resources for at least a second PDCCH.

Another innovative aspect of the subject matter described in this disclosure can be implemented in a network entity. The network entity generally includes a processing system configured to identify a first set of control channel transmission occasions according to a first control channel resource configuration and a transmitter configured to transmit a first physical downlink control channel (PDCCH) in one of the first control channel transmission occasions, the first PDCCH indicating at least one set of dynamic control channel resources.

Another innovative aspect of the subject matter described in this disclosure can be implemented in an apparatus for wireless communications by a user equipment (UE). The apparatus generally includes a processing system configured to identify a first set of control channel monitoring occasions according to a first control channel resource configuration, detect a first physical downlink control channel (PDCCH) in one of the first control channel monitoring occasions, the first PDCCH indicating at least one set of dynamic control channel resources, and monitor the at least one set of dynamic control channel resources for at least a second PDCCH.

Another innovative aspect of the subject matter described in this disclosure can be implemented in an apparatus for wireless communications by a network entity. The apparatus generally includes a processing system configured to identify a first set of control channel transmission occasions according to a first control channel resource configuration and an interface configured to output, for transmission, a first physical downlink control channel (PDCCH) in one of the first control channel transmission occasions, the first PDCCH indicating at least one set of dynamic control channel resources.

Another innovative aspect of the subject matter described in this disclosure can be implemented in a computer-readable medium for wireless communications. The computer-readable medium generally includes codes executable to identify a first set of control channel monitoring occasions according to a first control channel resource configuration, detect a first physical downlink control channel (PDCCH) in one of the first control channel monitoring occasions, the first PDCCH indicating at least one set of dynamic control channel resources, and monitor the at least one set of dynamic control channel resources for at least a second PDCCH.

Another innovative aspect of the subject matter described in this disclosure can be implemented in a computer-readable medium for wireless communications. The computer-readable medium generally includes codes executable to identify a first set of control channel transmission occasions according to a first control channel resource configuration, transmit a first physical downlink control channel (PDCCH) in one of the first control channel transmission occasions, the first PDCCH indicating at least one set of dynamic control channel resources.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for signaling and processing dynamic control channel resources.

The following description provides examples of dynamic control channel resource signaling and processing techniques, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
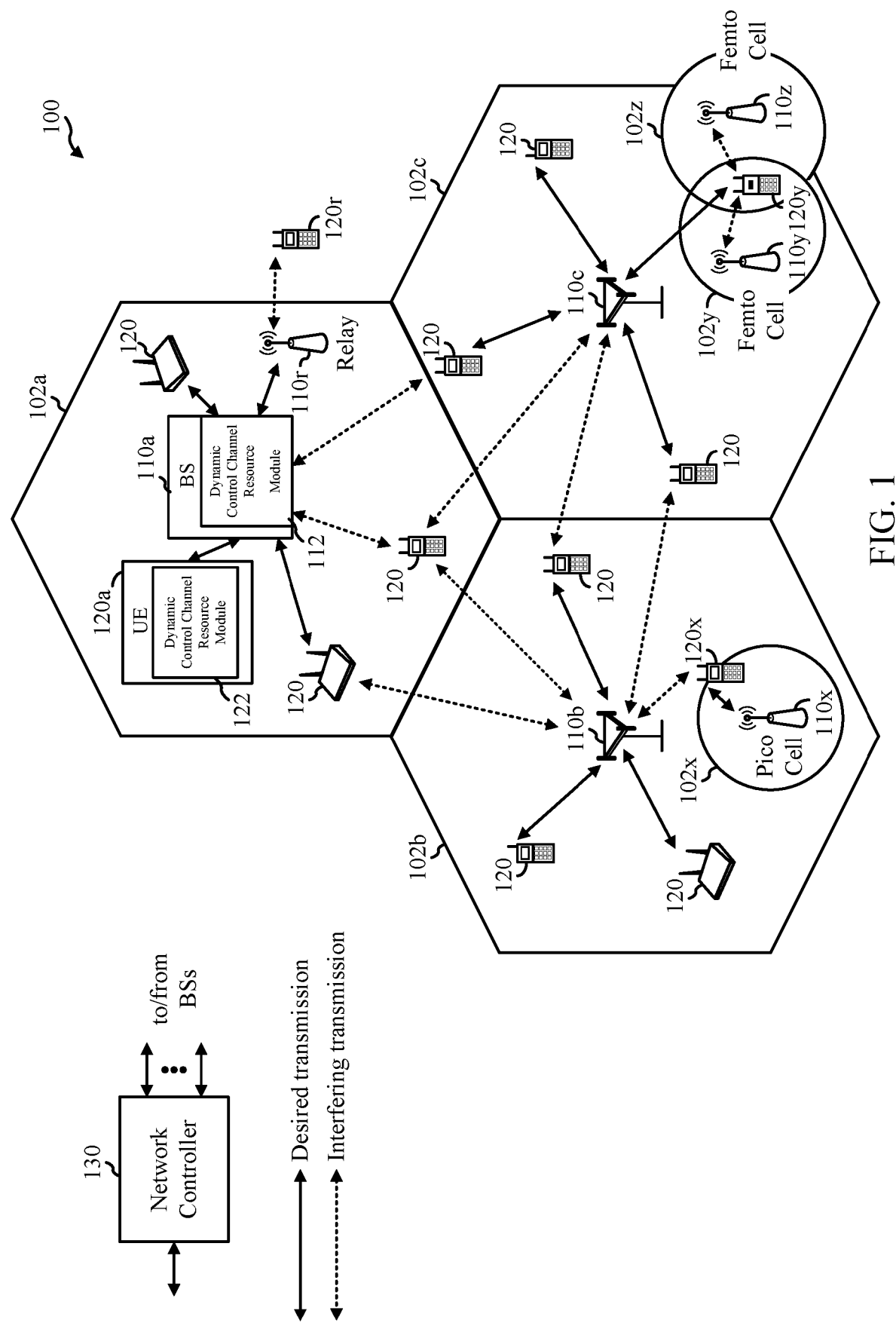
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a Dynamic Control Channel Resource Module 122 that may be configured to perform (or cause UE 120a to perform) operations 500 of FIG. 5. Similarly, base station 110a may include a Dynamic Control Channel Resource Module 112 that may be configured to perform (or cause BS 110a to perform) operations 600 of FIG. 6 (e.g., to signal dynamic control channel resources to a UE performing operations 500).

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
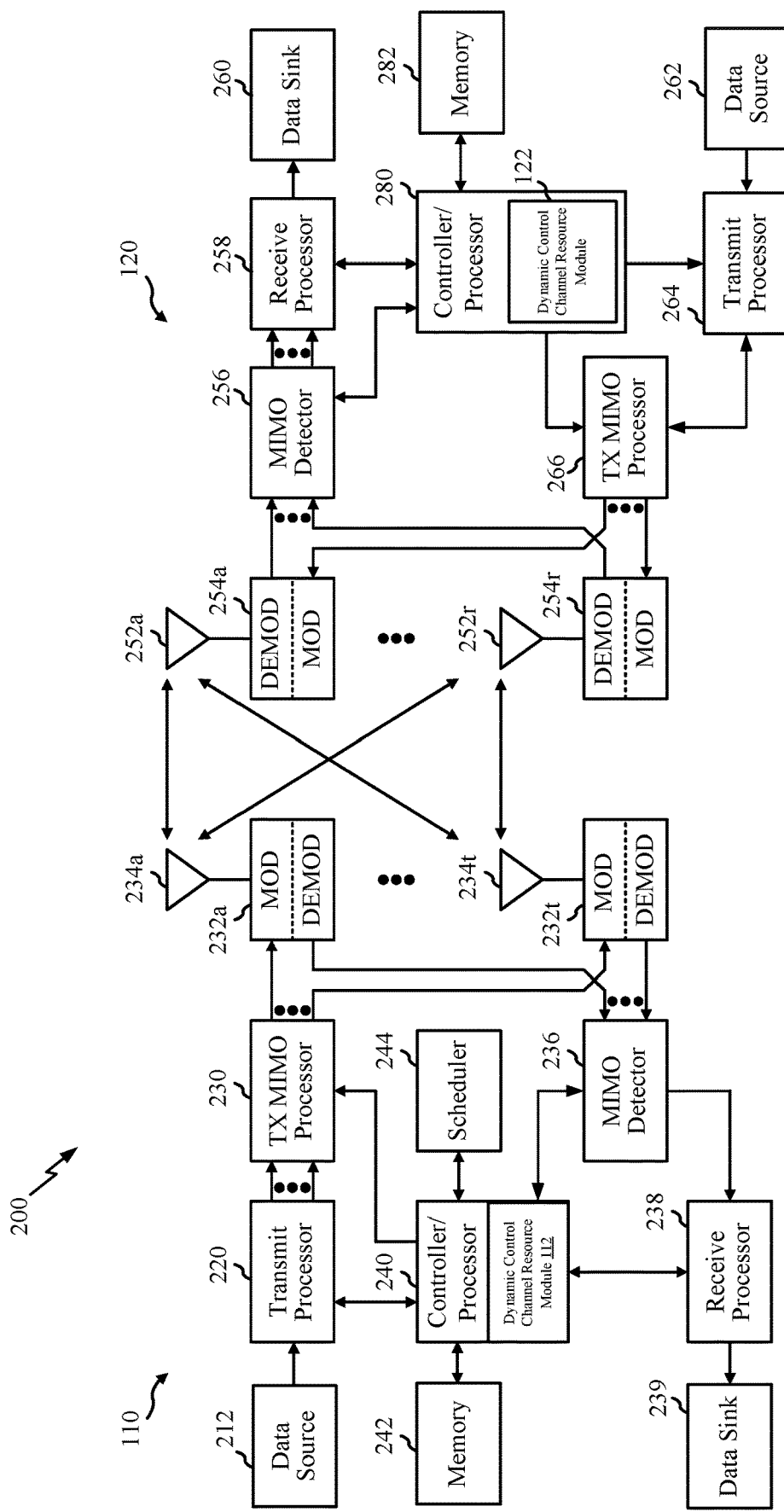
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a Dynamic Control Channel Module 122 that may be configured to perform operations 500 of FIG. 5, while the controller/processor 240 of the BS 110 has a Dynamic Control Channel Module 122 that may be configured to perform operations 600 of FIG. 6. Although shown at the Controller/Processor, other components of the UE or BS may be used to perform the operations described herein.

Figure 3:
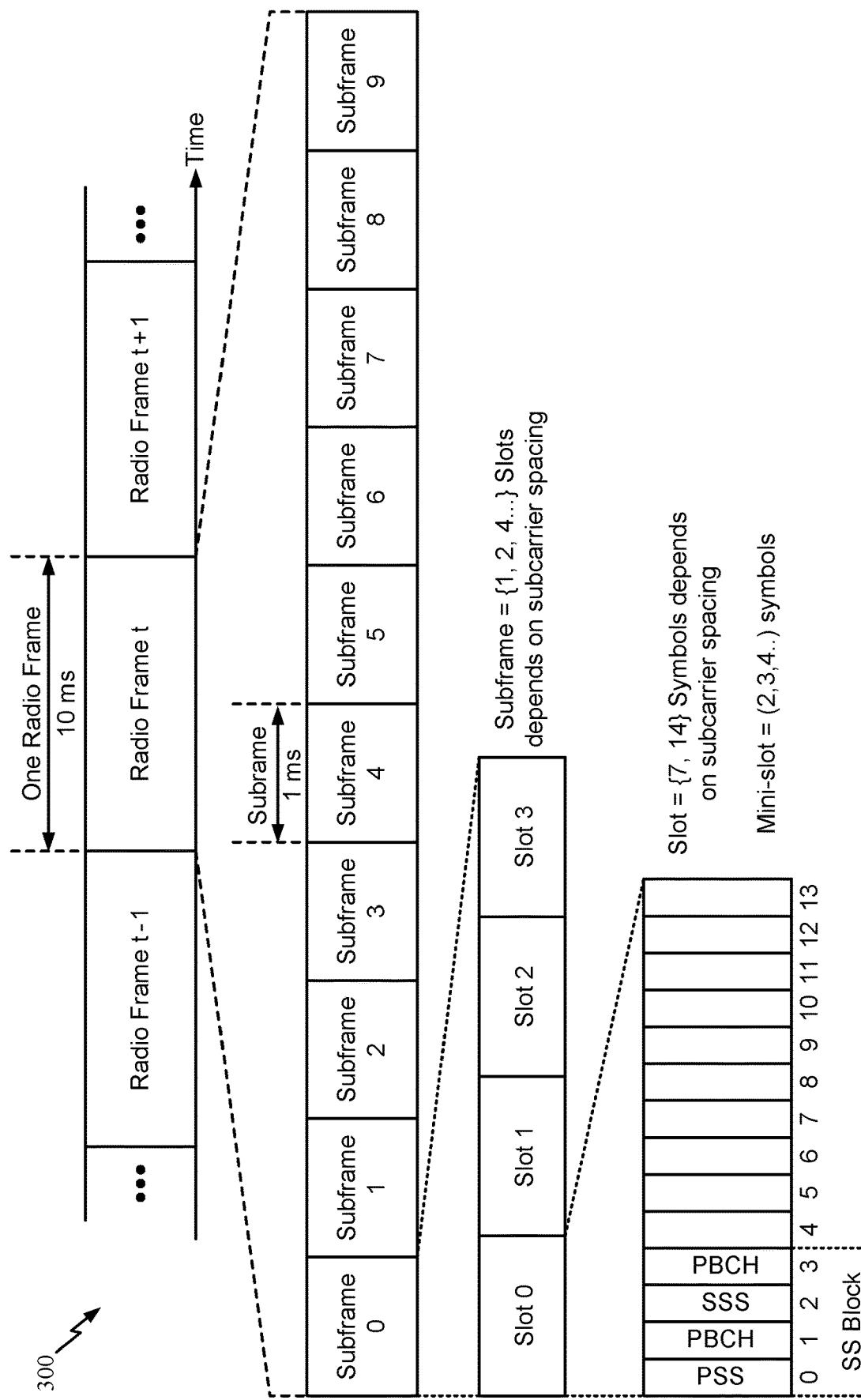
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods For Signaling Dynamic Control Channel Resources

Aspects of the present disclosure provide apparatus, methods, processing systems, and computer readable mediums for processing and signaling dynamic control channel resources. As will be described, the techniques presented herein may allow for the use of more sparse "regular" periodic control channel resources, allowing a UE to conserve power by staying in a low power state longer (e.g., unless dynamic control channel resources are indicated in the regular control channel resources).

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec.

Figure 4A:
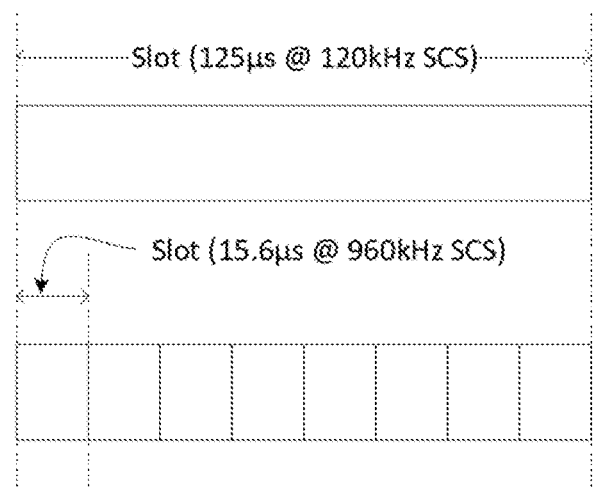
FIGS. 4A and 4B illustrate example

FIG. 4A shows a comparison of slot length for FR2 and FR4. The shorter slot length of FR4 creates challenges. For example, due to implementation complexity, the device's processing timeline (e.g., for control and data processing) may not proportionally scale with the slot length.

As a result, even with same-slot scheduling, FR2 may enjoy the power saving benefit of micro-sleep. However, in FR4, control channel processing may overrun the slot length and micro-sleep may not be eligible. This is illustrated in FIG. 4B that shows that processing times may far exceed FR4 slot lengths.

In FR2, a UE may be configured to monitor PDCCH in every slot. However, in FR4, due to limited processing capability and shorter slot length, the minimum PDCCH monitoring periodicity may need to be greater than one slot.

In certain applications, a UE may be designed to support a limited number of NR features (referred to as NR Light or NR Lite), for example, to keep costs low. Due to limited device capability in such applications, a UE may not be able to monitor PDCCH in every slot.

Figure 4B:
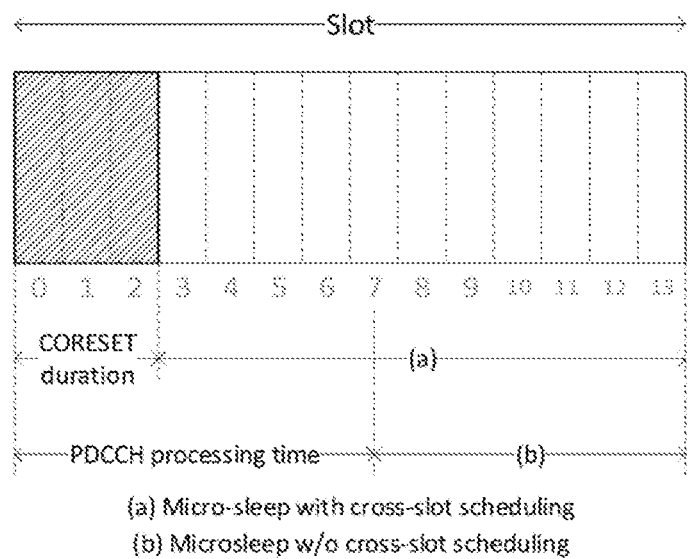

In FR4 or NR Lite applications, control channel resource (e.g., CORESETs as shown in FIG. 4B and search space sets) can be sparsely configured (e.g., occurring with a relatively low periodicity). Sparse control channel monitoring by the UE may alleviate the issues in the previous paragraphs and provides a power saving gain. For example, a PDCCH monitoring periodicity (e.g., by search space periodicity configuration in NR) can be very large (e.g., >>1 slots) in FR4.

Unfortunately, sparse control channel resources may limit scheduling flexibility and increase latency. Dynamic configuration and indication of additional control channel resource proposed herein may help avoid these drawbacks of sparse control channel resources. In some cases, a network entity (e.g., a gNB) may dynamically indicate additional control channel resources in certain conditions, for example, to accommodate an increase (burst) of traffic targeting a particular UE.

Figure 5:
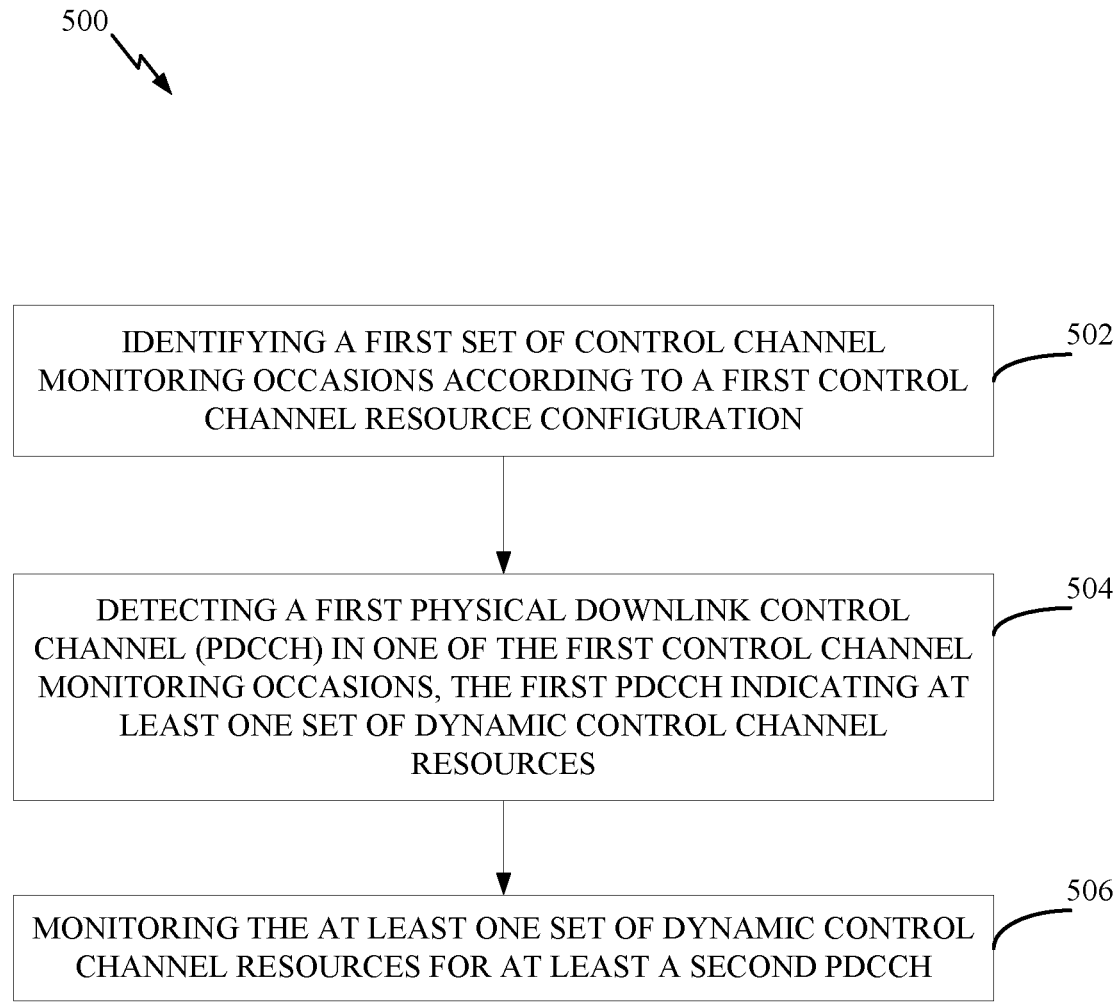
FIG. 5 illustrates example operations for wireless communication by a user equipment (UE), in accordance with some aspects of the present disclosure.

FIG. 5 illustrates example operations 500 for wireless communication by a UE, in accordance with some aspects of the present disclosure. For example, operations 500 may be performed by a UE 120a of FIG. 1 to utilize additional control channel resources dynamically indicated by a base station.

Operations 500 begin, at 502, by identifying a first set of control channel monitoring occasions according to a first control channel resource configuration. At 504, the UE detects a first physical downlink control channel (PDCCH) in one of the first control channel monitoring occasions, the first PDCCH indicating at least one set of dynamic control channel resources. At 506, the UE monitors the at least one set of dynamic control channel resources for at least a second PDCCH.

Figure 6:
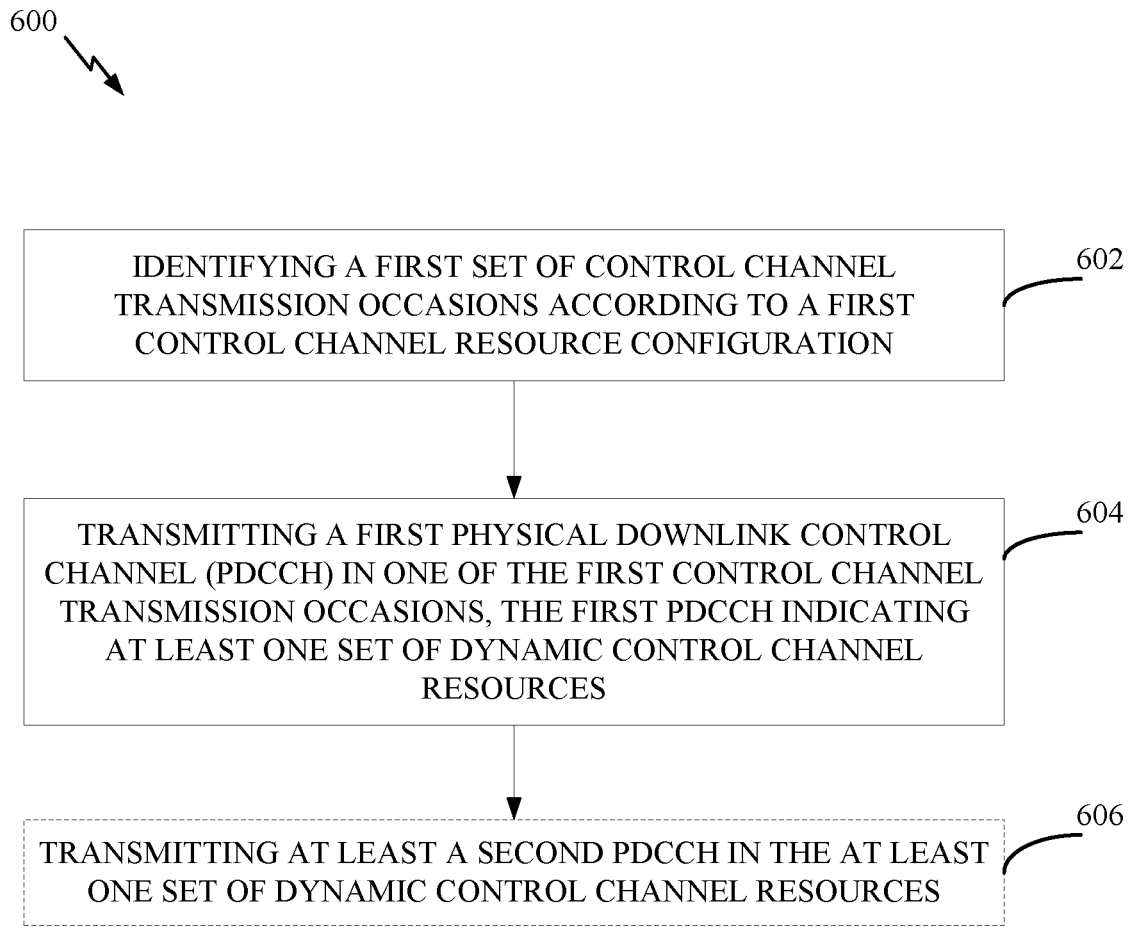
FIG. 6 illustrates example operations for wireless communication by a network entity, in accordance with some aspects of the present disclosure.

FIG. 6 illustrates example operations 600 for wireless communication by a network entity (e.g., a gNB). For example, operations 600 may be performed by a base station 110a of FIG. 1 to dynamically indicate additional control channel resources to a UE (performing operations 500).

Operations 600 begin, at 602, by identifying a first set of control channel transmission occasions according to a first control channel resource configuration. At 604, the network entity transmits a first physical downlink control channel (PDCCH) in one of the first control channel transmission occasions, the first PDCCH indicating at least one set of dynamic control channel resources. At 606, the network entity may transmit at least a second PDCCH in the at least one set of dynamic control channel resources.

Figure 7:
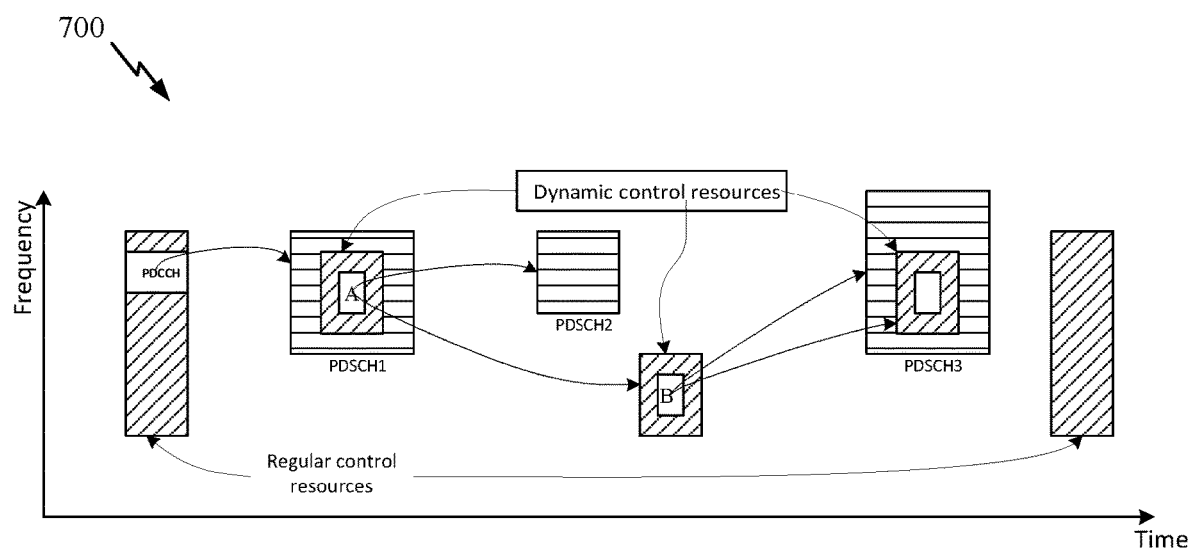
FIGS. 7-9 illustrate example timing diagrams for dynamic control resource signaling, in accordance with some aspects of the present disclosure.
Figure 8:
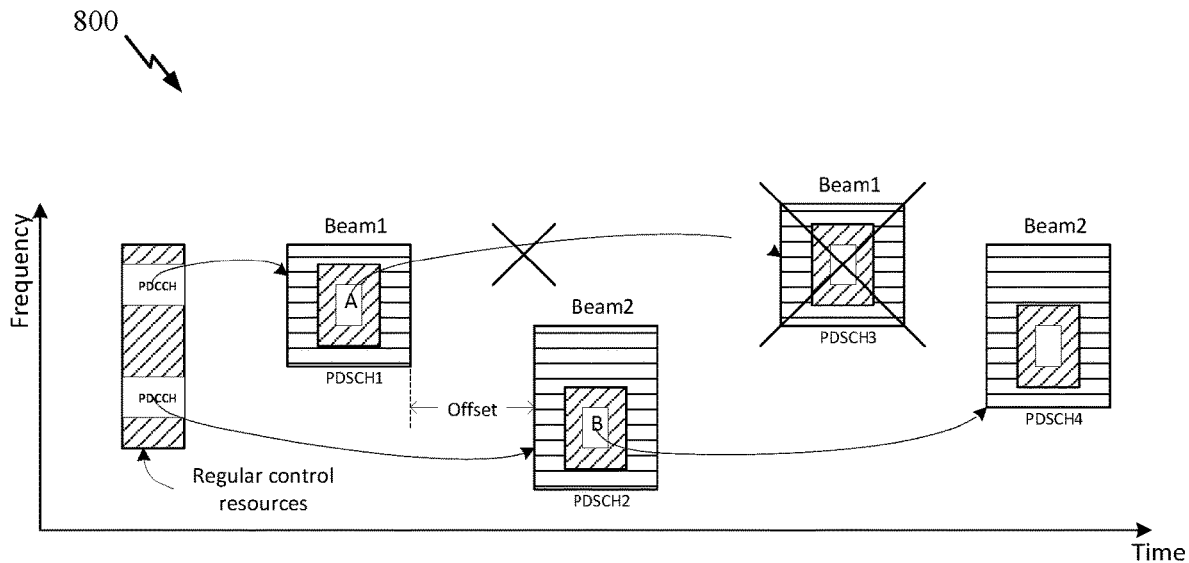
Figure 9:
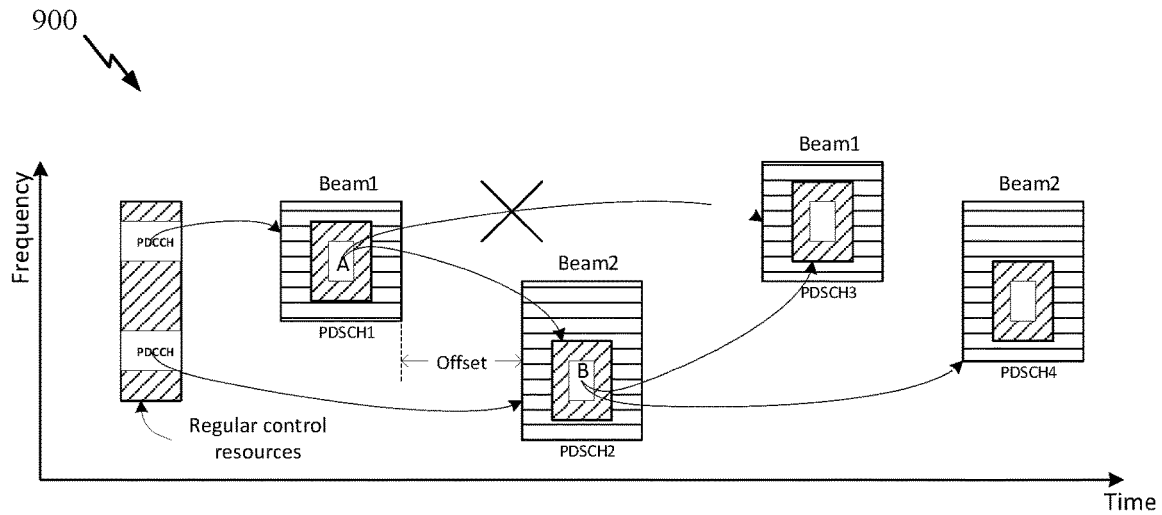

Operations 500 and 600 of FIGS. 5 and 6 may be understood with reference to the timing diagrams of FIGS. 7-9 that illustrate examples of how dynamic control channel resources can be indicated to the UE.

As illustrated in FIG. 7, the control channel resources may be indicated by dynamic signaling, for example, via a PDCCH in regular (sparse/periodic) control channel resource carrying downlink control information (DCI) or layer 1 (L1) signaling. Unlike regular control channel resources, the dynamic resources are non-recurring (aperiodic) and may be for one-shot (or a limited number of) transmission occasions.

In some cases, the network (gNB) may configure a UE with different options for sets of dynamic control channel resources. Based on the configuration and an indication, the UE can monitor control channels (PDCCH) within the dynamic control channel resources.

As illustrated in FIG. 7, dynamic control channel resources provided between sparse regular control channel transmission occasions, provides additional opportunities for control channel transmissions. As illustrated in FIG. 7, the dynamic resources may be nested within resources for a PDSCH scheduled by the PDCCH. As will be described below, in some cases, the dynamic resources may be offset in frequency from the scheduled PDSCH to avoid a collision.

As illustrated, in some cases a PDCCH/DCI sent in dynamic control signal resources may indicate still additional dynamic control channel resources (creating a chain). In some cases, if such a chain expands beyond a regular control channel resource, the UE may skip monitoring the regular control channel resource.

There are various options for how dynamic control channel resources may be triggered. For example, in some cases, one or more sets of dynamic control channel resources may be indicated simultaneously (as shown in FIGS. 8 and 9). For example, PDCCH can be used for signaling the dynamic control channel resources. As illustrated, the PDCCH may be transmitted either in the regular control channel resources or in other dynamic control channel resources.

In some cases, the PDCCH may be a UE-specific PDCCH for DL/UL scheduling and/or a non-scheduling group-common PDCCH (e.g., with no grant). In some cases, a DCI carried by the PDCCH may have an additional field or fields for indicating the dynamic resources can be added in the DCI. In other cases, a single field in the DCI may trigger multiple sets of dynamic resources jointly. In other cases, multiple separate fields may be used, each triggering a different set.

In some cases, a network entity may configure a UE with a list of one or more sets of dynamic control channel resources (e.g., by RRC signaling). In such cases, a triggering field in the DCI may include an index in the list.

In such cases, the configuration may include various parameters, such as: time/frequency resources, a resource mapping type (e.g., interleaved or localized), precoding, beam (e.g., quasi colocation (QCL)/TCI state), aggregation level, and/or a number of PDCCH candidates.

For joint triggering of multiple dynamic control channel resource sets, a combination of more than one sets of resources can be associated with a single entry in the list.

In some cases, Instead of pre-configuration (some or all of the dynamic control channel resource parameters), some parameters related to the dynamic resources may be determined at the moment of triggering. For example, when the dynamic resources are triggered by a DL scheduling DCI, the TCI state for the dynamic resources may be determined by the TCI state of the scheduled PDSCH (which may be particular appropriate when there is an overlap of resources).

Alternatively, at least one of the regular control channel resources can be indicated to the UE and the UE may determine dynamic control channel resources based on this regular configuration. In such cases, the same resource configuration as the regular control channel resources may be applied to the dynamic resources with some modification. For example, the periodicity configuration of the regular control channel may be ignored and the timing may be determined by an offset relative to the triggering DCI. As noted above, in some cases, a frequency shift (e.g., relative to the co-scheduled PDSCH) may be applied to avoid resource collision. In some cases, the dynamic indication may tell the UE to skip (avoid monitoring for PDCCH in) one or more regular control channel resources.

As indicated in FIGS. 7-9, dynamic control channel resources may be multiplexed with other channel resources. In such cases, if there is an overlap between the indicated dynamic control channel resources and other resources of the same UE, priority rules and/or rate-matching may be defined and applied. For example, if the UE's PDSCH resources overlap with dynamic control channel resources, the PDSCH may be rate-matched around the dynamic resources.

As noted above, in some cases, if at least one "chain" of dynamic control resources is maintained, the UE may skip monitoring regular control channel resources. The example shown in FIG. 7 shows such a chain, with a PDCCH in dynamic control channel resources (scheduled by a PDCCH in regular control channel resources) indicates another set of dynamic control channel resources (which, in turn, indicates till another set of dynamic control channel resources).

Unfortunately, if any of the PDCCH transmissions in the chain is missed, the chain may be broken. This is illustrated in FIG. 8, where the "X" indicates the UE fails to detect PDCCH A that indicates dynamic resources for a later PDCCH C. This illustrates a potential issue with a single dynamic control resource set indication, that if at least one PDCCH is missed, the impact propagates and all the subsequent dynamic control channel resources are lost.

FIG. 9 illustrates a second example that uses multiple dynamic control resource set indications. As illustrated, using multiple dynamic control resource set indications, even though one PDCCH is missed, the subsequent dynamic control channel resources can still be used. In this example, multiple sets of dynamic control channel resources are indicated in the regular control channel resources. Thus, even though PDCCH A is missed, PDCCH B is detected. Because PDCCH B also indicates the same dynamic resources as indicated by PDCCH A, PDCCH C can still be detected and the chain, while broke along one path, is maintained along another.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an Ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors 266, 258, 264, and/or controller/processor 280 of the UE 120 and/or processors 220, 230, 238, and/or controller/processor 240 of the BS 110 shown in FIG. 2 may be configured to perform operations 600 of FIG. 6.

Means for receiving may include a receiver (such as one or more antennas or receive processors) illustrated in FIG. 2. Means for transmitting or means for outputting may include a transmitter or an antenna(s) 234 of the B S 110 or antenna(s) 252 of the UE 120 illustrated in FIG. 2. Each of means for identifying, means for detecting, means for monitoring, means for skipping to monitor, means for determining, means for applying, means for rate matching and means for providing may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
    identifying a first set of control channel monitoring occasions according to a first control channel resource configuration;
    monitoring for a physical downlink control channel (PDCCH) in the first set of control channel monitoring occasions;
    detecting a first PDCCH in one of the first control channel monitoring occasions, the first PDCCH indicating at least one set of dynamic control channel resources;
    skipping monitoring for a PDCCH in at least one of the first set of control channel monitoring occasions if the detected first PDCCH indicates the dynamic control channel resources later in time than the at least one of the first set of control channel monitoring occasions; and
    monitoring the at least one set of dynamic control channel resources for at least a second PDCCH.

2. The method of claim 1, further comprising:
    detecting the second PDCCH in a first set of the at least one set of dynamic control channel resources, wherein the second PDCCH indicates at least a second set of dynamic control channel resources; and
    monitoring the second set of dynamic control channel resources for at least a third PDCCH.

3. The method of claim 2, wherein at least one of the first PDCCH or the second PDCCH indicates the UE can skip monitoring one of the first set of control channel monitoring occasions.

4. The method of claim 1, wherein:
    the first PDCCH carries a downlink control information (DCI) with a single field that indicates multiple sets of dynamic control channel resources; and
    the method further comprises monitoring each of the multiple sets of dynamic control channel resources for a PDCCH.

5. The method of claim 1, wherein:
    the first PDCCH carries a downlink control information (DCI) with multiple fields that each indicates at least one set of dynamic control channel resources; and
    the method further comprises monitoring the set of dynamic control channel resources indicated by each field for a PDCCH.

6. The method of claim 1, further comprising:
    receiving a configuration signaling indicating a list, each entry in the list being associated with one or more sets of dynamic control channel resources, wherein the first PDCCH indicates an index that points to an entry in the list.

7. The method of claim 6, further comprising:
    receiving a configuration of dynamic control channel resources, wherein the configuration indicates at least one of: time and frequency resources, a resource mapping type, precoding, beam quasi-colocation (QCL) information, aggregation level, or number of PDCCH candidates for each of the sets in the list; and
    monitoring the dynamic control channel resources for a PDCCH in accordance with the configuration.

8. The method of claim 6, wherein:
    the first PDCCH indicates a combination of more than one of the sets in the list; or
    at least one entry in the list is associated with multiple sets of dynamic control channel resources.

9. The method of claim 1, further comprising:
    identifying one or more sets of dynamic control channel resources based on the first control channel resource configuration; and
    monitoring the identified one or more sets of dynamic control channel resources for the second PDCCH.

10. The method of claim 9, wherein identifying one or more sets of dynamic control channel resources based on the first control channel resource configuration comprises:
    determining a frequency resource configuration for the one or more sets of dynamic control channel resources based on the resource configuration of the first control channel resource configuration;
    determining timing of the one or more sets of dynamic control channel resources based on one or more offsets in time relative to the first PDCCH; and
    monitoring the identified one or more sets of dynamic control channel resources for the second PDCCH based on the determined frequency resource configuration and determined timing.

11. The method of claim 1, wherein:
    the first PDCCH indicates one or more parameters for the at least one set of dynamic control channel resources; and
    the method further comprises monitoring the dynamic control channel resources for a PDCCH in accordance with the one or more parameters.

12. The method of claim 11, wherein:
    the first PDCCH schedules a physical downlink shared channel (PDSCH);
    the one or more parameters comprise a transmission configuration indicator (TCI) state determined based on a TCI state of the PDSCH; and
    the UE monitors the dynamic control channel resources for the PDCCH in accordance with the TCI state.

13. The method of claim 1, wherein:
    the set of dynamic control channel resources overlaps with other resources allocated to the UE; and
    the method further comprises applying one or more priority rules or rate matching based on the overlap.

14. A user equipment (UE), comprising:
a processing system configured to:
identify a first set of control channel monitoring occasions according to a first control channel resource configuration;
monitor for a physical downlink control channel (PDCCH) in the first set of control channel monitoring occasions;
detect a first PDCCH in one of the first control channel monitoring occasions, the first PDCCH indicating at least one set of dynamic control channel resources;
skip monitoring for a PDCCH in at least one of the first set of control channel monitoring occasions if the detected first PDCCH indicates the dynamic control channel resources later in time than the at least one of the first set of control channel monitoring occasions; and
monitor the at least one set of dynamic control channel resources for at least a second PDCCH.

15. A method for wireless communications by a network entity, comprising:
identifying a first set of control channel transmission occasions according to a first control channel resource configuration; and
transmitting a first physical downlink control channel (PDCCH) in one of the first control channel transmission occasions, the first PDCCH indicating at least one set of dynamic control channel resources, wherein the first PDCCH further indicates the UE can skip monitoring one of the first set of control channel transmission occasions if the first PDCCH indicates the at least one set of dynamic control channel resources later in time than at least one of the first set of control channel monitoring occasions.

16. The method of claim 15, wherein the at least one set of dynamic control channel resources are nested within resources for a physical downlink shared channel (PDSCH).

17. The method of claim 15, wherein:
the first set of control channel transmission occasions comprise periodic control channel transmission occasions; and
the at least one set of dynamic control channel resources are between two of the periodic control channel transmission occasions of the first set.

18. The method of claim 15, further comprising:
transmitting at least a second PDCCH in the at least one set of dynamic control channel resources, wherein:
the second PDCCH indicates at least a second set of dynamic control channel resources; and
the method further comprises transmitting a third PDCCH in the second set of dynamic control channel resources.

19. The method of claim 15, wherein the first PDCCH comprises:
a UE-specific PDCCH that schedules an uplink or downlink transmission;
a group-common PDCCH that schedules an uplink or downlink transmission or
a group-common PDCCH that does not schedule an uplink or downlink transmission.

20. The method of claim 15, wherein:
the first PDCCH carries a downlink control information (DCI) with a single field that indicates multiple sets of dynamic control channel resources; or
the first PDCCH carries a downlink control information (DCI) with multiple fields that each indicates at least one set of dynamic control channel resources.

21. The method of claim 15, further comprising:
providing the UE a list, each entry in the list being associated with one or more sets of dynamic control channel resources, wherein the first PDCCH indicates an index that points to an entry in the list.

22. The method of claim 21, further comprising:
providing the UE a configuration of the one or more sets of the dynamic control channel resources, wherein the configuration indicates at least one of: time and frequency resources, a resource mapping type, precoding, beam quasi-colocation (QCL) information, aggregation level, or number of PDCCH candidates for each of the sets in the list; and
transmitting at least a second PDCCH in accordance with the configuration and on the at least one set of dynamic control channel resources.

23. The method of claim 21, wherein:
the first PDCCH further indicates a combination of more than one of the sets in the list; or
at least one entry in the list is associated with multiple sets of dynamic control channel resources.

24. The method of claim 15, further comprising:
identifying one or more sets of dynamic control channel resources based on the first control channel resource configuration; and
transmitting at least a second PDCCH on the identified one or more sets of dynamic control channel resources.

25. The method of claim 24, wherein:
the identification of the one or more sets of dynamic control channel resources based on the first control channel resource configuration comprises:
determining a frequency resource configuration for the one or more sets of dynamic control channel resources based on the resource configuration of the first control channel resource configuration; and
determining timing of the one or more sets of dynamic control channel resources based on one or more offsets in time relative to the first PDCCH; and
the transmission of at least the second PDCCH on the identified one or more sets of dynamic control channel resources is based on the determined frequency resource configuration and determined timing.

26. The method of claim 15, wherein:
the first PDCCH indicates one or more parameters for the at least one set of dynamic control channel resources; and
the method further comprises transmitting at least one PDCCH on the dynamic control channel resources in accordance with the one or more parameters.

27. The method of claim 26, wherein:
the first PDCCH schedules a physical downlink shared channel (PDSCH);
the one or more parameters comprise a transmission configuration indicator (TCI) state determined based on a TCI state of the PDSCH; and
the method further comprises transmitting a PDCCH in the dynamic control channel resources in accordance with the TCI state.

28. The method of claim 15, further comprising:
transmitting at least a second PDCCH on the at least one set of dynamic control channel resources, wherein at least one of the first PDCCH or the second PDCCH indicates the UE can skip monitoring one of the first set of control channel transmission occasions.

29. A network entity, comprising:
a processing system configured to identify a first set of control channel transmission occasions according to a first control channel resource configuration; and a transmitter configured to transmit a first physical downlink control channel (PDCCH) in one of the first control channel transmission occasions, the first PDCCH indicating at least one set of dynamic control channel resources, wherein the first PDCCH further indicates the UE can skip monitoring one of the first set of control channel transmission occasions if the first PDCCH indicates the at least one set of dynamic control channel resources later in time than at least one of the first set of control channel monitoring occasions.

* * * * *